United States Patent
Graneau et al.

[15] 3,646,243
[45] Feb. 29, 1972

[54] COOLANT CIRCUIT FOR RESISTIVE CRYOGENIC ELECTRIC POWER TRANSMISSION LINE

[72] Inventors: Peter Graneau; Joseph L. Smith, Jr., both of Concord, Mass.

[73] Assignee: Simplex Wire and Cable Company, Burlington, Mass.

[22] Filed: Oct. 27, 1969

[21] Appl. No.: 869,476

[52] U.S. Cl. ............................... 174/15, 174/DIG. 6, 62/514
[51] Int. Cl. ............................................................ H01b 7/34
[58] Field of Search ............... 174/15, 15 C, 15 SC, 16, 16 B; 62/514, 52, 79

[56] References Cited

UNITED STATES PATENTS

| | | | |
|---|---|---|---|
| 3,463,869 | 8/1969 | Cooley et al. | 174/15 |
| 3,461,218 | 8/1969 | Buchhold | 174/15 |
| 3,396,551 | 8/1968 | Dimentberg | 174/15 X |
| 3,375,675 | 4/1968 | Trepp et al. | 62/514 X |
| 3,292,016 | 12/1966 | Kafka | 174/15 X |

Primary Examiner—Lewis H. Myers
Assistant Examiner—A. T. Grimley
Attorney—McLean, Morton and Boustead

[57] ABSTRACT

A coolant circuit for refrigerated electric power transmission cable utilizing coolant in the cable in which capacity to accommodate cyclic peak loads, overloads, and emergency conditions is provided;

1. by operating the cable coolant circuit with a liquid-phase coolant in the cable under superatmospheric pressure and normally maintaining the temperature of the coolant substantially below its vaporization temperature such that cyclic peak loads and temporary overloads and emergencies can be accommodated by the thermal mass of the coolant, i.e., by allowing the temperature of the coolant to rise while maintaining it in the liquid phase.
2. by flashing refrigerant contained in a reservoir located exteriorly of the cable to obtain added cooling capacity in cases of prolonged overload and emergency, and
3. by employing parallel electrical circuits in a common coolant loop such that the entire refrigerating capacity can be utilized to cool one electrical circuit in the event of breakdown of the other.

Accommodation to long term increase in required cable capacity is also provided.

10 Claims, 5 Drawing Figures

Patented Feb. 29, 1972

INVENTORS
PETER GRANEAU
JOSEPH L. SMITH, JR.

BY
McLean, Morton and Boustead
ATTORNEYS

Patented Feb. 29, 1972
3,646,243
2 Sheets-Sheet 2
FIG.3
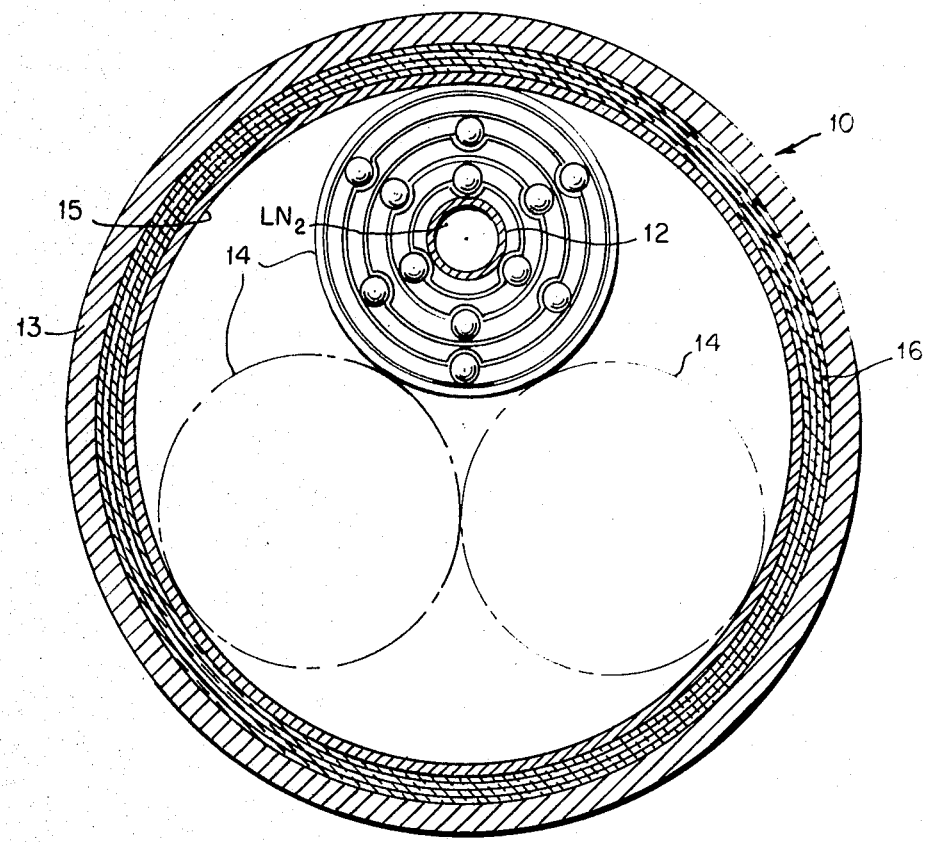
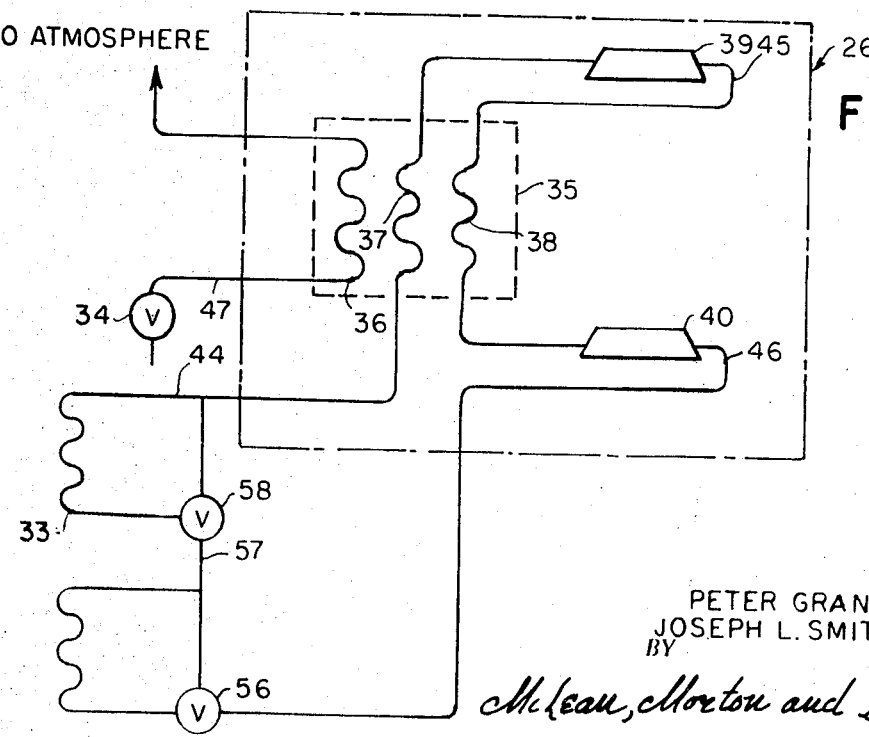
FIG.4
INVENTORS
PETER GRANEAU
JOSEPH L. SMITH, JR.
BY
McLean, Morton and Boustead
ATTORNEYS

COOLANT CIRCUIT FOR RESISTIVE CRYOGENIC ELECTRIC POWER TRANSMISSION LINE

This invention relates to electric power transmission and has particular applicability to circulation of a coolant in a coolant circuit in heat exchange relationship with conductors of a transmission line.

This invention is specifically directed to the problems in a resistive cryogenic electric power transmission line created by cyclic load variations, overloads, and emergencies, and has for its object the design of a coolant circuit in which the refrigerating capacity utilized to extract heat from the coolant is designed for less than the heat generated at anticipated cyclic peak load and approximates that of some intermediate anticipated operating load, but which coolant circuit is capable of accommodating cyclic peak loads of diurnal, weekly, and seasonal nature as well as overloads and emergency conditions.

In another aspect of this invention, it is an object to provide a coolant circuit for a resistive cryogenic electric power transmission line in which temporary breakdown in one power circuit can be accommodated by increasing the capacity of one or more parallel power circuits.

It is also an object of this invention to provide coolant circuits for resistive cryogenic electric power transmission lines in which the power handling capacity of a transmission line can be increased to accommodate long term increases.

With the increasing cost of the acquisition of land for right of ways required for aerial cable installations, attention has been directed to the employment of underground electric power transmission in suburban, as well as urban areas. The manufacturing costs of paper-insulated cable and the size of the conductor required to achieve a given load capacity when the only heat sink is the ambient soil have also lead to consideration of the use of underground cables employing coolant systems in which Joule heat losses in the conductor are extracted by a flowing coolant, e.g., a liquid cryogen. One particularly suitable cable for underground use utilizing a circulating coolant is the high-vacuum insulated cable in which the conductors are tubular and are supported in a vacuum spaced one from the other, with suitable shielding where required, within a buried pipe.

This invention has particular applicability to such high-vacuum insulated cable, whether used in an underground installation or not, but is also generally applicable to cables in which a conductor is cooled by circulation of a coolant, particularly a cryogen in the liquid phase, in heat exchange relationship with one or more conductors. The invention in some aspects, however, is also applicable to use of gas-phase coolants and two-phase coolants, i.e., liquid gas mixture and liquid-solid mixtures where part or all of the heat is absorbed by change of phase of the coolant.

With these generalities in mind, further discussion below will be usually confined to description of AC transmission lines involving three-phase circuits in which each conductor is tubular in shape, is constructed of high-purity aluminum, e.g., 99.9 percent pure anodized aluminum, and is cooled by circulation through its center of liquid nitrogen maintained under superatmospheric pressures and at temperatures between 63° K. and 105° K. This invention, however, has equal applicability to other conductor materials with which other coolants are circulated in heat exchange-relationship.

In accordance with this invention, there is provided both a coolant circuit for a resistive cryogenic electric power transmission line and a method of operation of such circuit to accommodate cyclic peak loads, overloads, and emergency conditions. It will be understood by "resistive cryogenic electric power transmission line" reference is intended to electric cables operated to carry large quantities of power in which heat is extracted from the current-carrying conductors by circulation of a refrigerated fluid, i.e., coolant in heat exchange relationship with the current-carrying conductors such that the conductors are operated at temperatures substantially below those of the environment but usually above those in which the conductors exhibit superconducting properties. In certain aspects, however, it will be apparent that operation at temperatures in the superconducting range can be employed.

In accordance with one aspect of this invention, it is contemplated that a coolant circuit will be employed to circulate a coolant, which is maintained at a superatmospheric pressure to hold it in the liquid phase in heat exchange relationship with the conductor to be cooled. Refrigerating capacity is provided, for example, in the form of a refrigerating plant including a cryogenerator, i.e., a refrigerator for extracting heat at low temperatures, such that, under normal load conditions, the refrigeration capacity is adequate to maintain the temperature of the coolant circulating in heat exchange relationship with the conductor at a temperature substantially below the vaporization temperature of the coolant at the lowest pressure encountered while in heat exchange relationship with the conductor. The mass of coolant employed is selected taking into consideration the cooling capacity required in excess of the refrigerating capacity of the installation at cyclic peak loads anticipated and taking into consideration the duration of such cyclic peak loads in excess of refrigerating capacity such that the excess cooling capacity required over that supplied by the refrigerating capacity is accommodated by allowing the temperature of the coolant to increase to some temperature less than the maximum at which the coolant remains in the liquid state under the pressure conditions to which it is subjected while in heat exchange relationship with the conductor.

In other words, refrigerating capacity of the refrigerating plant is selected between that cooling capacity required to carry the cyclic minimum loads and that required to carry the cyclic peak loads such that, during operations in which cooling capacity required is less than refrigerating capacity of the refrigerating plant, the coolant is lowered in temperature, in effect, to "store cold" which then can be utilized to supply the added cooling capacity required in excess of the refrigerating capacity of the plant during periods of peak loads. The same "stored cold" is available to meet temporary overloads and other emergencies.

In another aspect of this invention, it is contemplated that substantial quantities of additional coolant will be stored exteriorly of the cable in suitable reservoirs typically located at the site of the refrigerating plant or plants such that the refrigerating capacity of the plant can also be utilized to refrigerate the reservoir coolant and store additional cold in excess of that required normally to maintain operation of the cable in accommodating normal cyclic load variations. In this aspect of the invention, when unusual peak loads are encountered or prolonged overloads are present because of emergency conditions, the additional coolant in the reservoir is a liquefied refrigerant such that the stored cold in the reservoir of liquid refrigerant can also be utilized, even when its temperature approaches that of vaporization by flashing the refrigerant in the reservoir to reduce the temperature of the remaining liquid in the reservoir through the release of the heat of vaporization of the flashed refrigerant. In this aspect of the invention, the refrigerant in the reservoir can be the same material as the coolant employed in the coolant circuit, but the coolant circuit can also use different coolants, such as gas-phase substances and the like.

In yet another aspect of this invention, it is contemplated that each resistive cryogenic electric power transmission line will include at least a pair of electrically parallel electrical power circuits of two or more conductors such that coolant is circulated in a loop in one direction through the conductors of one power circuit and in the reverse direction through the conductors of another power circuit with the refrigerating plant located at one end of or both ends of the power circuits, or at some intermediate position along the power circuits. In such an arrangement, if there is a failure in one power circuit causing its breakdown, all the coolant can be circulated in both directions in the conductors of the other circuit thereby increasing the capacity of that circuit to absorb Joule heating losses such that it can accommodate the load of both circuits, at least for limited periods of time, to enable repair of the circuit which has broken down.

In a further aspect of this invention, when all other means have failed, added refrigerating capacity can be provided by filling additional cold liquid refrigerant into the reservoir without disturbing operation of the transmission line. Liquid nitrogen is generally available, and this availability is one of the advantages of the material as a coolant in the systems of the present invention.

In another aspect of this invention, it is contemplated that long term growth in electrical loads which must be handled by most given transmission lines can be accommodated simply by adding additional refrigerating capacity in the form of additional refrigerating plants at the location of the original refrigerating plant or at new locations spaced along the length of the transmission lines at closer intervals than the original design.

For a more complete understanding of the practical application of this invention, reference is made to the appended drawings in which:

FIG. 3 is a cross section of a three-phase circuit, such as is shown in FIG. 1;

FIG. 4 is a schematic diagram of a cryogenerator suitable for use in connection with the apparatus shown in FIG. 2.

Figure 1:
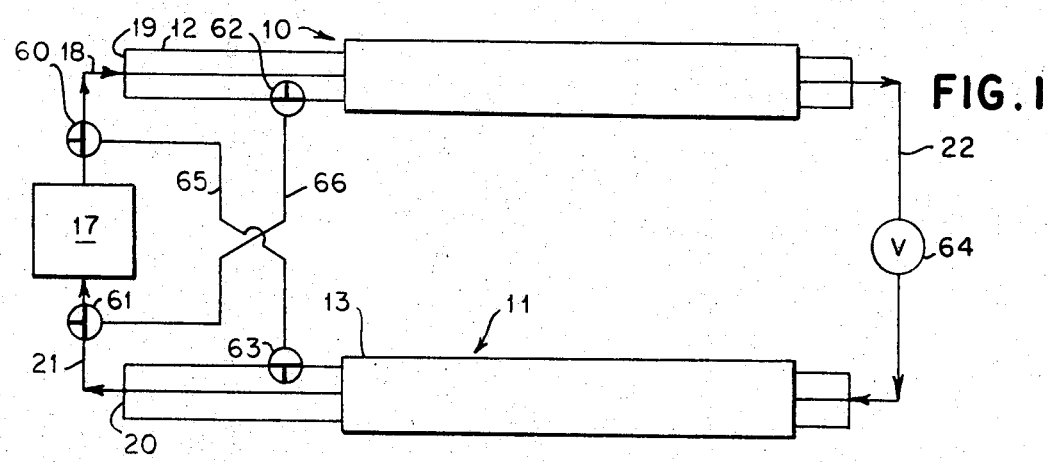
FIG. 1 is a schematic diagram of a resistive cryogenic electric power transmission line in accordance with this invention.

Referring to FIG. 1, a coolant circuit in accordance with the present invention includes two electrically parallel, three-phase power circuits 10 and 11 which are physically disposed side by side buried in a common trench. The actual electrical terminations of power circuits 10 and 11 are irrelevant to the present invention except that, in accordance with one aspect of this invention, they are arranged each to carry one-half of the power load of the transmission line.

Figure 2:
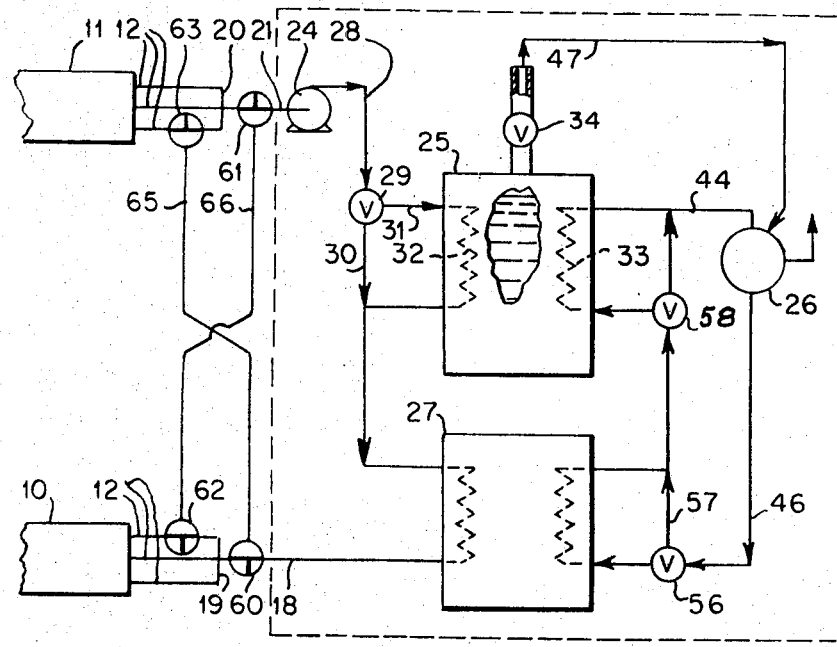
FIG. 2 is a schematic diagram of a portion of the apparatus shown in FIG. 1.

Referring more particularly to FIGS. 2 and 3, each power circuit 10 and 11 (power circuit 10 only being shown in FIG. 3, although it will be understood power circuit 10 is physically identical with power circuit 11) includes three tubular electric conductors 12 which are disposed within buried steel pipe 13. Each conductor 12 is 99.9 percent anodized aluminum and is supported at intervals along pipe 13 by means of spacers 14 such that conductors 12 are disposed equidistant one from the other and each from the walls of pipe 13 and are also electrically isolated one from the other and from pipe 13. Spacers 14 preferably are of the type disclosed in copending Graneau application Ser. No. 727,993, filed May 9, 1968, now U.S. Pat. No. 3,542,938. Interiorly, pipe 13 is lined with an aluminum eddy current shield 15 in the form of an aluminum tube and an interposed layer of thermal insulation 16. The interior of each pipe 13 and shield 15 is operated at high vacuum on the order of $10^{-6}$ to $10^{-8}$ millimeters of mercury.

The coolant circuit of this invention further includes a refrigerating plant 17 for supplying liquefied nitrogen, $LN_2$, at superatmospheric pressure through a line 18 and a manifold 19 to the ends of conductors 12 at one pair of adjacent ends of power circuits 10 and 11. Refrigerating plant 17 is further designed to withdraw liquid nitrogen, $LN_2$, from the ends of conductors 12 in power circuit 11 at the same adjacent pair of ends of circuits 10 and 11 through a manifold 20 and a line 21. Refrigerating plant 17 is arranged, as described below, to cool the liquid nitrogen, $LN_2$, withdrawn through line 21, to repressure it, and to return it to line 18. Connections are provided, as indicated by reference numeral 22, to circulate liquid nitrogen from conductors 12 of power circuit 10 to conductors 12 of power circuit 11 at the adjacent pair of ends of circuits 10 and 11 remote from refrigerating plant 17.

Referring more particularly to FIG. 2, refrigerating plant 17 includes a circulating pump 24, a liquid nitrogen reservoir tank 25, a cryogenerator 26, and a heat exchanger 27. Pump 24 is arranged with its suction side connected to line 21 and its discharge side connected to a line 28 leading to a three-way regulating valve 29 arranged in one mode to connect line 28 to a line 30 leading through heat exchanger 27 to line 18. In its other mode, valve 29 connects line 28 to a line 31 leading through a coil 32 disposed in reservoir 25 and thence back to line 30, heat exchanger 27 and line 18. Reservoir 25 is adapted to receive and retain at a low temperature a large supply of liquid nitrogen, $LN_2$, and contains a coil 33 as well as coil 32, each of which are positioned to be in heat exchange relationship with the supply of liquid nitrogen retained in tank 25. In addition, tank 25, which is constructed to withstand internal subatmospheric pressure, is provided with a vent valve 34 located to communicate the upper interior of tank 25 through line 47 with the atmosphere when opened.

Cryogenerator 26, referring to FIG. 4, is operated utilizing neon gas as a refrigerant and includes a heat exchanger 35, having three heat exchange elements 36, 37, and 38, a compressor and aftercooler 39 and a turboexpander 40 which are connected to extract heat from tank 25 and from heat exchanger 27. The neon cycle refrigerator requires a closed, hermetically sealed system. Thus the intake side of cryogenerator 26, as indicated by line 44, leads from coil element 33 in tank 25 through element 37 of heat exchanger 35 to compressor 39 which discharges via line 45 through element 38 to expander 40. The last discharges through line 46 to a three-way regulator valve 56 which, in first mode, leads through line 57 to a three-way regulatory 58. In its first mode, valve 58 connects line 57 through coil 33 to line 44 and, in its second mode, valve 58 connects line 57 directly to line 44 and the return to cryogenerator 26. In the second mode of valve 56, line 46 is connected through heat exchanger 27 to line 57 and then to valve 58. Vent valve 34 is connected to atmosphere through line 47 and element 36 of heat exchanger 35.

Connections are provided to permit circulation of liquid nitrogen in either circuit 10 or circuit 11 to the exclusion of the other by means of a valve 60 in line 18, a valve 61 in line 21, a valve 62 in one conductor 12 of circuit 10 located adjacent manifold 19, a valve 63 in one conductor 12 of circuit 11 adjacent manifold 20 and a valve 64 in line 22. Each of valves 60, 61, 62, 63 and 64 is normally in a position passing flow in the line or conductor in which it is connected. Valve 64 has a second position closing flow in line 22. A line 65 interconnects normally closed ports in valves 60 and 63, and a line 66 interconnects normally closed ports in valves 61 and 62. Valves and 63 have a second position diverting flow in line 18 through line 65 to the conductor 12 in which valve 63 is connected, closing flow from line 18 to manifold 19 and closing flow from manifold 20 into conductor 12 in which valve 63 is connected. Similarly, valves 61 and 62 have a second position diverting flow from conductor 12 in which valve 62 is located to line 21, closing flow from manifold 20 into line 21 and closing flow from manifold 20 into conductor 12 in which valve 62 is located.

In operation, liquid nitrogen, $LN_2$, in line 18 entering power circuit 10 at an inlet temperature typically of 65° K. and the 20 atmospheres pressure flows through the conductors 12 of circuits 10 and 11 and is returned to line 21 on the suction side of circulator 24. The circulating coolant $LN_2$ encounters a pressure drop of 10 atmospheres in circuits 10 and 11 and rises to a temperature of 75° K. thus accommodating not only the Joule heat losses in circuits 10 and 11 but also those losses introduced by terminal heat load and fixed losses from the environment, e.g., the ambient soil to the coolant in conductor 12. Ideally, cryogenerator 26 has a refrigerating capacity capable of maintaining these inlet and outlet temperatures for some load on circuits 10 and 11 intermediate cyclic peak loads and minimum loads with all of the neon refrigerant flowing from cryogenerator 26 through heat exchanger 27, i.e., in the second mode of valve 56 and first of valve 58. In this state, it will be appreciated that at some earlier time the liquid nitrogen in reservoir 25 was subcooled to 65° K. with vent valve 34 closed leaving a subatmospheric pressure in the space above the liquid level in tank 25.

Typically the neon entering coil 33 of tank 25 from valves 58 and 56 and line 46 is at 63.5° K. and 10.66 atmospheres and is heated in coil 33 to 73.8° K. valve 58 is adjusted on variation of cooling requirements to divide the flow between line 57 and heat exchanger 27 to maintain this temperature. In the cycle in cryogenerator 26, neon absorbs heat in element 37 and enters compressor 39 at 298.5° K. and 10.54 atmospheres. In compressor 39 the neon is compressed to 20 atmospheres and heats to 300° K., additional heat being rejected from the circuit at this point. On returning through element 38 of heat exchanger 35 the neon is cooled to 77.9° K. and then is further cooled in expander 40 back to 63.5° K. for recycle to tank 25 and heat exchanger 27.

When the transmission line, including circuits 10 and 11, is required to carry a load in excess of its continuous rating, i.e., when the cooling requirements exceed the refrigerating capacity of cryogenerator 26, the first indication is that the output temperature of liquid nitrogen in line 21 increases above 75° K. Since the output of cryogenerator 26 is constant, the input temperature of liquid nitrogen to cable 10 in line 18 will show a corresponding increase above 65° K.

At this point, valve 29 is adjusted to divide the circulating coolant liquid nitrogen, $LN_2$, between line 30 and line 31. The change from the first mode of operation of valve 29 to the second is gradual so that a balance can be struck between flow in line 31 and the flow directly to line 30 from valve 29 such that the inlet temperature to circuit 10 in line 18 can be kept at 65° K. As the temperature of the liquid nitrogen in tank 25 increases, vent valve 34, which is a pressure relief valve, is opened at 77° K. (When the vapor pressure of liquid nitrogen equals one atmosphere). Cold nitrogen vapor is passed in line 47 to cryogenerator 26, where in element 36 it is used to aid in extracting heat from the neon before venting the nitrogen vapor to atmosphere. This condition of operation can be maintained indefinitely to a point in which the outlet temperature of liquid nitrogen leaving circuit 11 approaches 103° K., and so long as the supply of liquid nitrogen in tank 25 is replenished.

When the outlet temperature of liquid nitrogen in line 21 approximates 103° K. (vaporization temperature at 10 atmospheres) and the inlet temperature of liquid nitrogen in line 18 is still at 65° K., maximum heat is removed from the double circuit system. These conditions define the heat exchange requirements in tank 25 and heat exchanger 27 and the size of reservoir required in tank 25.

After a period of maximum sustained overload, the load in the system returns to normal full load rating, i.e., the load matched by the cryogenerator 26 refrigerating capacity, the outlet temperature of liquid nitrogen in line 21 will fall, and the rate of vaporization of liquid nitrogen in tank 25 will decrease until the outlet temperature of liquid nitrogen in line 21 returns to 77° K. At this point, valve 29 shunts all flow of coolant past tank 25 and vent valve 34 closes. The outlet temperature in line 21 will continue to decrease until it reaches 75° K. at which steady state conditions return.

Sooner or later, the load will dip below full load level. Such periods in which the cooling capacity required in circuits 10 and 11 is less than the capability of cryogenerator 26 must be used to subcool the stored liquid nitrogen in tank 25. At this point, i.e., when the temperature of liquid nitrogen in line 21 falls below 75° K., valve 58 is operated to divert some or all neon refrigerant from line 57 through coil 33 until the temperature in tank 25 decreases to about 75° K. At that point valve 56 is operated, as the loading conditions on cable 10 and 11 permit, to pass some or all of the neon refrigerant in line 46 from cryogenerator 26 directly to coil 33 in tank 25. This procedure may have to be repeated several times until the tank 25 temperature falls to about 65° K. During periods of subcooling of the stored liquid nitrogen in tank 25, the inlet and outlet temperatures in lines 18 and 21 can be allowed to increase a few degrees depending upon anticipated load conditions at the time. On completion of the subcooling process, and assuming no overload has to be supported, the inlet temperature at line 18 is then reduced to 65° K. and the outlet temperature in line 21 settles at some equilibrium less than or approximating 75° K. at which point the system has recovered its full overload capability.

Referring to FIG. 1, it will be appreciated at anytime during operation of power circuits 10 and 11, should there occur a breakdown in one power circuit requiring shutdown of the circuit for repair or otherwise disabling the circuit, the entire load of the transmission line can be thrown on the other power circuit. Such will result in essentially quadrupling the Joule heat losses in the circuit, but by rerouting the flow of liquid nitrogen coolant $LN_2$ through the single circuit taking the load, the cooling capacity of that circuit can also be increased to accommodate the new load, at least temporarily. In such an arrangement, valve 64 is closed. Valves 60 and 63 are operated to divert flow from line 18 through line 65 when circuit 11 is to remain in service, and valves 61 and 62 are operated to divert flow through line 66 when circuit 10 is to remain in service. In each case flow is serially in one direction in one conductor 12 and in the reverse direction in the other two conductors 12 of the circuit 10 or 11 remaining in service.

Figure 5:
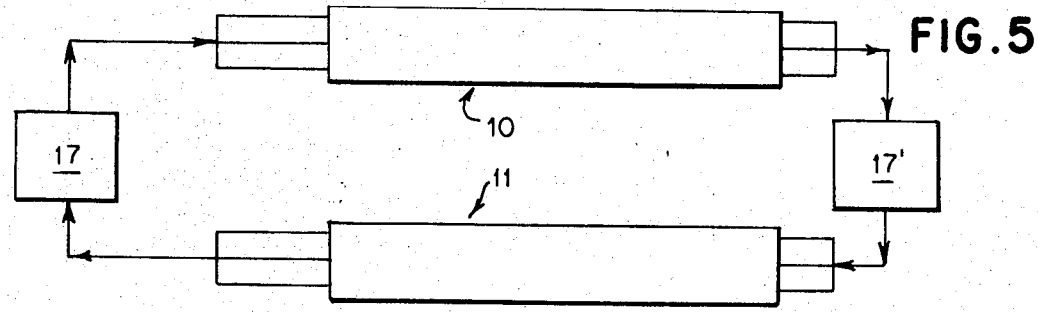
FIG. 5 is a modification of the transmission line shown in Fig. 1 to provide added capacity in accordance with the invention.

Referring more particularly to FIG. 5, provision is made for accommodating the transmission line constituted by circuits 10 and 11 to long term growth in power-handling requirements of the transmission line. In accordance with this invention, when the load-handling capability of the transmission line shown in FIG. 1 has reached the maximum that can be handled without employing additional transmission lines, the capacity of the transmission line can be increased without the addition of new cables by adding refrigerating capacity in the form of additional cryogenerators or complete refrigerating plants 17' at intervals along the transmission line thus effectively increasing the refrigerating capacity of each segment of the transmission line and hence its power-handling capability. Thus in accordance with this invention refrigeration capacity of a given transmission line is increased in stages to accommodate long term increase in load. Typically, the line is operated initially with one small refrigerating plant at one station on the line. Next a larger plant is installed at the same location. Then a second plant is added at a second station on the line. Thereafter intermediate stations are added.

We claim:
1. A coolant circuit in combination with a resistive cryogenic electric power transmission line, which power line includes electric circuit means having a conductor, which coolant circuit includes:
   A. First heat exchange means for containing a coolant in heat exchange relationship with said conductor;
   B. A reservoir for containing a vaporizable liquid and including
      i. second heat exchange means for containing said coolant in heat exchange relationship with said liquid;
   C. Refrigeration means including
      i. third heat exchange means for containing said coolant to extract heat therefrom;
   D. Means for circulating said coolant through said first, second and third heat exchange means,
      i. said circulating means being normally operable to circulate said coolant through said first and third heat exchange means when the cooling requirements imposed on the coolant circuit are met by or are exceeded by the refrigerating capacity of said refrigerating means, and
      ii. said circulating means being operable to circulate said coolant through said first, second and third heat exchange means when said cooling requirements exceed said refrigerating capacity; an;
   E. Vent means connected to said reservoir,
      i. said vent means being normally closed, and
      ii. said vent means being operable upon a rise of the temperature of said liquid contained in said reservoir to a preselected value to permit escape from said reservoir of vaporized liquid.
2. The combination according to claim 1 in which

B. said refrigerating means further includes
   ii. fourth heat exchange means located in heat exchange relationship with said liquid in said reservoir operable to extract heat from said liquid when said cooling requirements are exceeded by said refrigerating capacity.

3. The combination according to claim 1 in which said coolant is a liquefiable gas and which further includes
   F. Means for maintaining superatmospheric pressure on said coolant whereby said coolant is maintained in the liquid state.

4. The combination according to claim 1 for a resistive cryogenic electric power transmission line in which said power line includes a pair of electrically parallel electrical power circuits, each electric circuit having at least two conductors.
   A. Said first heat exchange means having portions for containing said coolant in heat exchange relationship with each of said conductors; and
   D. Said circulating means further including
      iii. connections whereby said coolant is normally circulated in a loop through said first heat exchange means with the portions thereof associated with the conductors in each electric circuit connected in parallel and with the portions thereof associated with the conductors in one electric circuit connected in series with the portions thereof associated with the conductors of the other electric circuit, and
      iv. connections whereby said coolant can be circulated in series through the portions of said first heat exchange means associated with the conductors of one said electric circuit to the exclusion of such portions associated with the conductors of the other said electric circuit.

5. A coolant circuit in combination with a resistive cryogenic electric power transmission line in which said power line includes a pair of electrically parallel electrical power circuits, each electric circuit having at least two conductors,
   A. First heat exchange means having portions for containing said coolant in heat exchange relationship with each of said conductors;
   B. Refrigeration means including
      i. second heat exchange means for containing said coolant to extract heat therefrom;
   C. Means for circulating said coolant including
      i. connections whereby said coolant is normally circulated in a loop through said first and second heat exchange means with the portions of said first heat exchange means associated with the conductors in each electric circuit connected in parallel and with the portions of said first heat exchange means associated with the conductors in one electric circuit connected in series with the portions thereof associated with the conductors of the other electric circuit, and
      ii. connections whereby said coolant can be circulated in series through the portions of said first heat exchange means associated with the conductors of one said electric circuit and said second heat exchange means to the exclusion of such portions associated with the conductors of the other said electric circuit.

6. A method for cooling a resistive cryogenic electric power transmission line which includes circulating a coolant in heat exchange relationship with the elements of a power line to be cooled, maintaining a refrigeration zone for extracting heat from said coolant, maintaining a body of vaporizable liquid, circulating said coolant between heat exchange relationship with said transmission line elements and heat exchange relationship with said refrigeration zone during periods in which the cooling requirements of said elements are met by or are exceeded by the refrigerating capacity of said refrigeration zone, circulating said coolant in heat exchange relationship with said body of liquid when said cooling requirements exceed said refrigerating capacity, and venting vaporized liquid from said body of liquid when the temperature thereof rises above a preselected value.

7. A method according to claim 6 which additionally includes utilizing the refrigerating capacity of said refrigeration zone to extract heat from said body of liquid during periods in which said cooling requirements are exceeded by said refrigerating capacity.

8. A method according to claim 6 in which said coolant is a liquefiable gas and which further includes maintaining superatmospheric pressure on said coolant whereby said coolant is maintained in liquid state.

9. A method according to claim 8 which further includes utilizing the refrigerating capacity of said refrigeration zone to lower the temperature of said coolant substantially below its vaporization temperature under the maintained superatmospheric pressure during periods in which said cooling requirements are exceeded by said refrigerating capacity.

10. A method for cooling a resistive cryogenic electric power transmission line which includes circulating a coolant in heat exchange relationship with the elements of a power line to be cooled, said coolant being a liquefiable gas, maintaining superatmospheric pressure on said coolant whereby said coolant is maintained in liquid state, maintaining a refrigeration zone for extracting heat from said coolant, circulating said coolant between heat exchange relationship with said transmission line elements and heat exchange relationship with said refrigeration zone, and utilizing the refrigerating capacity of said refrigeration zone to lower the temperature of said coolant substantially below its vaporization temperature under the maintained superatmospheric pressure during periods in which said cooling requirements are exceeded by said refrigerating capacity.

* * * * *